(12) United States Patent
Lause

(10) Patent No.: US 10,935,359 B2
(45) Date of Patent: Mar. 2, 2021

(54) STANDARD TOOL DIAMETER GAGE

(71) Applicant: Shawn Thomas Lause, Leslie, MO (US)

(72) Inventor: Shawn Thomas Lause, Leslie, MO (US)

( * ) Notice: Subject to any disclaimer, the term of this patent is extended or adjusted under 35 U.S.C. 154(b) by 181 days.

(21) Appl. No.: 16/252,248

(22) Filed: Jan. 18, 2019

(65) Prior Publication Data

US 2019/0162515 A1 May 30, 2019

Related U.S. Application Data

(63) Continuation-in-part of application No. 15/133,411, filed on Apr. 20, 2016, now Pat. No. 10,184,775.

(51) Int. Cl.
*G01B 5/08* (2006.01)

(52) U.S. Cl.
CPC ...................... *G01B 5/08* (2013.01)

(58) Field of Classification Search
CPC .................. G01B 5/08; B23Q 17/22
See application file for complete search history.

(56) References Cited

U.S. PATENT DOCUMENTS

| | | | |
|---|---|---|---|
| 3,732,624 A * | 5/1973 | Eisele | G01B 5/245 33/543 |
| 4,663,998 A | 5/1987 | Parsons | |
| 5,030,920 A | 7/1991 | Nakamura | |
| 5,880,847 A * | 3/1999 | Wakaoka | G01B 11/2408 356/613 |
| 5,943,923 A | 8/1999 | Shih | |
| 6,206,619 B1 * | 3/2001 | Frisbie | B23B 51/02 408/144 |
| 7,876,454 B2 * | 1/2011 | Du | G01B 11/24 356/601 |
| 2017/0045357 A1 * | 2/2017 | Lummes | G05B 19/401 |

FOREIGN PATENT DOCUMENTS

JP 02298459 A 12/1990

* cited by examiner

*Primary Examiner* — Charlie Y Peng

(57) ABSTRACT

A device used in a spindle or fixture to measure tool sizes. The device has two cylindrical shapes that have precision machined surfaces. The device's face has a precise size which is the same nominal size as that of a material removing tool. The device's shaft allows for concentric and precision fastening of the device to a spindle or a fixture. The nose of the device is located on the end of the larger of the two cylindrical shapes which is visible exposed when mounted and used. The end of the device is at the end of the smaller of the two cylindrical shapes which is hidden after mounting. The device allows more accurate programming of machine tools thus providing higher quality results on machined work pieces and reducing machining cycles.

14 Claims, 7 Drawing Sheets

FIG. 11

| Nominal Tool Size | Decimal Equivalent | Indicator Reading | Actual Tool Size |
|---|---|---|---|
| 1/2 inch | .5000 | -.0007 | .4986 |
| 13 mm | .5118 | -.0005 | .5108 |
| 15.7 mm | .6181 | -.0013 | .6155 |
| 17.7 mm | .6968 | +.0001 | .6970 |
| 3/4 inch | .7500 | -.0002 | .7496 |
| 20 mm | .7874 | -.0013 | .7848 |
| 25 mm | .9843 | -.0014 | .9815 |
| 1 inch | 1.0000 | -.0006 | .9988 |
| 28 mm | 1.1024 | -.0055 | 1.0914 |
| 1-1/4 inch | 1.2500 | +.0014 | 1.2528 |
| 1-1/2 inch | 1.5000 | -.0190 | 1.4620 |
| 42 mm | 1.6535 | +.0011 | 1.6557 |
| 1-7/8 inch | 1.8750 | +.0115 | 1.8980 |
| 2 inch | 2.0000 | -.0004 | 1.9992 |
| 52 mm | 2.0472 | -.0006 | 2.0460 |
| 2-3/8 inch | 2.3750 | -.0002 | 2.3746 |
| 3 inch | 3.0000 | -.0019 | 2.9962 |
| 80 mm | 3.1496 | +.0032 | 3.1560 |
| 90 mm | 3.5433 | +.0038 | 3.5509 |
| 6 inch | 6.0000 | -.0020 | 5.9960 |

STANDARD TOOL DIAMETER GAGE

CROSS-REFERENCE TO RELATED APPLICATION

This non-provisional application claims priority to pending non-provisional application No. 15/133,411 filed on Apr. 20, 2016 which is owned by the same inventor.

BACKGROUND OF THE INVENTION

The present invention relates to a method used to precisely measure a cutting tool.

Cutting tools used in CNC machines are made to nominal sizes but rarely measure the precise size to which they were designed. The precision machining of components serving many industries becomes more demanding each passing year. Computerized Numerical Control, or CNC, machine tools become more advanced, software programming becomes more powerful, and new cutting tools grow in user acceptance based on their particular strategy. Throughout all of these continuing improvements with technology, one variable goes overlooked: a nominal size tool does not always measure its designed precise size.

Precise work pieces undergo manufacturing with the use of CNC machines, very accurate and precise themselves. A CNC machine tool has three linear axes of motion while more advanced CNC machine tools have four axes, five axes, or more. CNC machine tools have advanced far and repeat toolpath positions reach well within 0.0002" (two ten-thousandths of an inch).

Machine tool programming software plays a vital role in achieving efficient toolpaths in CNC machines. To achieve this, an operator must program accurate toolpaths at the machine or through offline computer-aided manufacturing software, or CAM. CNC programs, or tool paths, have a primary basis from the size of tool specified. Toolpaths have accuracy to or finer than 0.0002" (two ten-thousandths of an inch). Tooling used in machining centers has rapidly grown in size and shape. Specific tool geometry also meets certain criteria to achieve specific tool path strategies. These tools have a common construction from high speed steel, cobalt, and carbide whether from a solid material, or component, or two or more materials, or components, commonly known as indexable tools. Tools have designs to standard nominal sizes in both imperial and metric units.

With the investment in a CNC machine, CAM software, and dedicated tooling, operators, or machinists, expect high quality results to precisely machine components. However this is not always the result.

More often than not, a tool does not measure the exact nominal size of its design. Software continues to apply paths correctly within 0.0002", the machine tool continues to repeat a toolpath within 0.0002", but the cutting tool more commonly varies and becomes the reason behind low quality results.

A machinist has difficulty measuring tools with hand instruments. Tools have very fine cutting edges, sometimes an odd number of flutes, or sometimes variable flute geometry, just to name a few hindrances to the machinist. Tools very rarely measure their nominal size within 0.0002" (two ten-thousandths of an inch). Some CNC machines offer an electronic means to measure a tool however, such machines will not always identify the condition of a tool with multiple flutes.

SUMMARY OF THE INVENTION

The present invention provides a custom gage to accurately measure a cutting tool so the accurate size presents itself to a machinist for programming into a machine tool. Both embodiments of the invention have precision manufactured diameters that measure within 0.0002" (two ten-thousandths of an inch). The diameters of both embodiments have manufacturing concentric to their corresponding shaft and pocket. The shaft and the pocket of both embodiments allow accurate positioning of the precision diameters in a tool holder. The distance from the face on the diameters to the dead center of the apertures serves as a common set point. The nose side on the end of the gage appears as the visible side when mounted in a tool holder.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is that it brings attention to an issue that is often overlooked and assumed when machining components: nominal sized cutting tools do not measure their precise diameter.

Another object of the present invention is to provide a device to accurately measure a cutting tool with the use of the custom gage so a machinist may utilize the precise size when programming a machine tool.

Another object of the present invention is to provide a device to accurately measure a cutting tool that reduces multiple cycle runs, improves accuracy of the finished product, and prevents scrap workpieces.

Another object of the present invention is to provide a device to accurately measure a cutting tool that individually pinpoints each of the different cutting edges on a cutting tool.

Another object of the present invention is to provide a device to accurately measure a cutting tool that offers a readily visible way to evaluate the integrity of a tool.

Another object of the present invention is to provide a device to accurately measure a cutting tool that provides a standard way of gaging a tool over its lifespan of low and high levels of force leading to changes in their geometry.

Another object of the present invention is to provide a way for users to accurately measure their cutting tool.

Another object of the present invention is to provide a method and device that can be used by any user with minimal skill levels.

Another object of the present invention is to provide an accurate way of setting adjustable tools mounted in a spindle.

With the ability to determine cutting tool sizes outside a machining center the present invention provides an efficient way to measure using a fixture. Machining center time is more valuable than fixture time due to their manufacturing capabilities.

BRIEF DESCRIPTION OF DRAWINGS

In reference to the drawings.

The same reference numerals refer to the same parts throughout the various figures.

DETAILED DESCRIPTION OF THE INVENTION

The foregoing features, object, and advantages of the invention will become apparent to those skilled in the trade from the following detailed description of the preferred embodiment, especially when considered in conjunction with the accompanying drawings.

The present invention, the Standard Tool Diameter Gage, offers the ability to accurately measure a cutting tool in or outside a machine tool.

With its precise size and capability to be easily mounted into a machine spindle or fixture the present invention serves as an excellent method to measure tool sizes.

Figure 1A:
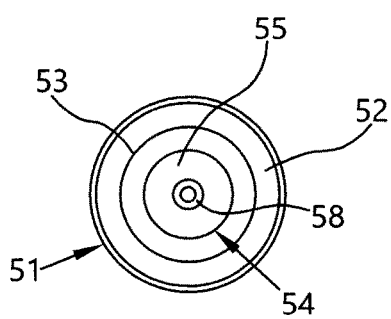
FIG. 1A is a top view of the invention.
Figure 2A:
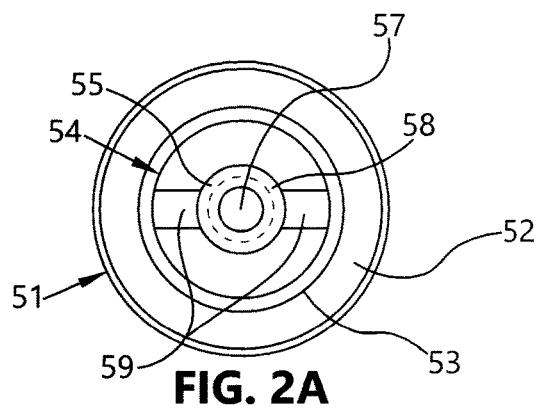
FIG. 2A is a top view of the alternate embodiment.
Figure 1:
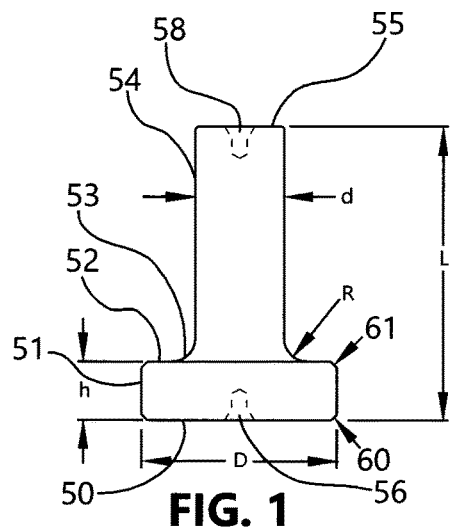
FIG. 1 is a front view of the invention.
Figure 2:
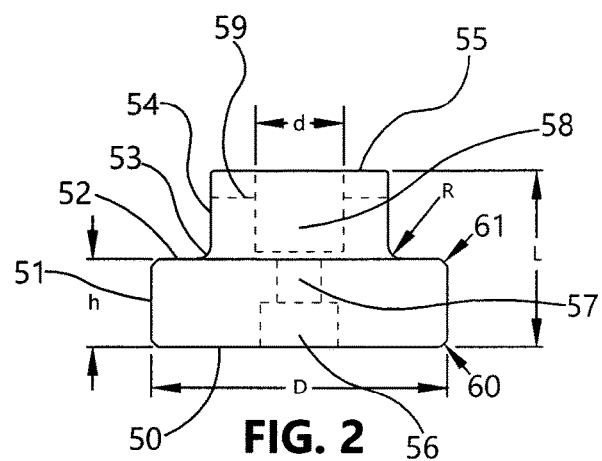
FIG. 2 is a front view of an alternate embodiment of the invention.

FIG. 1 and FIG. 2 show the operating dimensional characteristics of the present invention. "D" represents the main measuring diameter, or gage diameter, of the invention or device. "d" represents the shank or arbor size. "h" represents the land area of the measuring diameter. The measuring diameter can be a minimum size of 0.09375 inches and a maximum size of 24.000 inches. "R" represents the corner where a radius assists in manufacturing. "L" is the overall length of the gage, present invention, or device. FIG. 1 shows a front view of a round cylindrical shaped head 62.

Figure 1B:
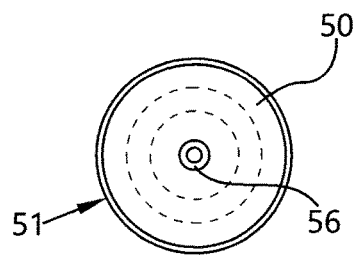
FIG. 1B is a bottom view, opposite of that of FIG. 1A.

FIG. 1 is a front view of the invention with a shank 54 for mounting. An aperture 56, or first aperture, and aperture 58, or second aperture, are shown in the center of a nose 50 and an end 55, respectively. Then, FIG. 1A is a top view of the invention shown in FIG. 1. And, FIG. 1B is a bottom view opposite of that of FIG. 1A. All geometry and features are concentric between FIGS. 1, 1A, 1B.

Figure 2B:
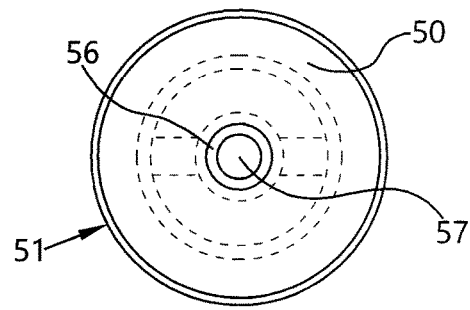
FIG. 2B is a bottom view opposite of FIG. 2A.

FIG. 2 is a front view of the alternate embodiment of the invention with a pocket 58 for mounting. The aperture 56 and aperture 58 are shown in the center of the nose 50 and the end 55. Then, FIG. 2A is a top view of the alternate embodiment with a horizontal slot 59 is shown located on the end 55. And, FIG. 2B is a bottom view opposite of FIG. 2A where the face 51, aperture 56, and aperture 57 are concentric.

FIG. 1 shows a front view of the present invention. The first diameter as at D is the gage size of the device that is manufactured to precise nominal values. The second diameter as at d is the shank of the device used for mounting into a tool holder. The present invention, or gage has a nose 50 with a face 51 that abuts a block later shown. The nose 50 of the gage is perpendicular to the face 51 and has a flat form. The face has a parallel orientation to the shank and extends circumferentially about the nose. The face 51 also has as its diameter D, main diameter, or face diameter measured to within 0.0002 inches. More particularly, h is the height of the face, or thickness of the head. The face has its height h less than the length L of the invention, preferably less than one quarter of the length L as shown. The face 51 and the shank 54 are concentric to each other within 0.0001 inch. The concentricity deviation between the face 51 and the shank 54 must be held to a minimum to prevent inaccuracies. Measuring within ten thousandths of an inch (0.0001) any inaccuracies between the face 51 and the shank 54, and the face 51 and the gage diameter, will compound error when determining the actual tool size as later mentioned. The concentricity tolerance between the face 51 and the shank 54 needs to be less than one ten thousandths of an inch (0.0001). Moreover, the shank 54 is centered upon the head, that is, centered behind the nose. A shoulder zo 52 is perpendicular to the face 51 and is tangent to a neck 53. The neck 53 has a small radius which serves as a transition between the shoulder 52 and a shank 54 and the neck flares outwardly and downwardly from the shank to the shoulder. The shoulder has a greater diameter than the shank. The shoulder merges and tapers into the head opposite the nose as shown. The shank 54 is dimensionally longer than the face 51 for clamping and has an end 55 which is parallel to the nose 50. The shank 54 is of a round, cylindrical shape and has parallel sides when shown in a front, a side, or a back view. The shank has its diameter d generally less than the diameter D of the nose 50. The width of the invention steps inwardly from the diameter D of the nose to the diameter d of the shank as shown. The neck flares outwardly from the shank, opposite the end and its second aperture. The neck merges into the shoulder, outwardly from the shank. The shank 54 mounts and clamps into a tool holder and extends a portion of its length outwardly from the tool holder. A first aperture 56 is located in the dead center of the device on the nose 50. A second aperture 58 is located in the dead center of the device on the end 55, and opposite the nose. The end 55 is smaller in size in comparison to the nose 50. The first aperture 56 and the second aperture 58 are blind apertures that are drilled in the centerline of the device. The first aperture 56 and the second aperture 58 are shallow in depth and that have sixty degree inclusive bevels at their entries. The first aperture and the second aperture have a common center, concentric with the centerline, that is, longitudinal axis of the shank 54. The first aperture 56 and the second aperture 58 serve as centers for aid in manufacturing. The present invention allows an operator to insert the end 55 into a spindle of a CNC machine tool for referencing it to a setting on a test indicator as later shown.

The neck 53 follows a curve with a radius of R as shown. The radius R of the curve varies from about 5% to about 10% of the face diameter D. From the neck through the shoulder to the face, the face has its height h as shown. The height of the face h extends from about 0.25 inch to about 1.00 inch. The face height also forms a portion of the length L of the invention. The length L extends from about 2.5 inches to about 10 inches. Alternatively, the face height varies from about 2.5% to about 10% of zo the length L. As mentioned above, the invention has a generally round form and is thus symmetric FIG. 1A shows a top view of the device shown in FIG. 1. The end 55 is in the center of the shank 54 and retains the second aperture 58. The shank 54 is beneath and perpendicular to the end 55 and follows down to the neck 53. The shank is also perpendicular to the head and is opposite the nose 50. The neck 53 is adjacent to the shank 54 which is adjacent to the shoulder 52. The face 51 of the invention hangs beneath the shoulder 52. The center of the end 55 is the second aperture 58. The face 51 and the shank 54 should be machined together preferably in the same manufacturing setup so that the face 51 is parallel and true to the shank 54 and the centerline of the shank. The shank 54 should be manufactured within one ten thousandths of an inch (0.0001) and should have a surface finish of 32 RMS, root mean square of profile height deviation from the mean line, or better.

FIG. 1B shows a bottom view of the device shown in FIG. 1. The nose 50 is the complete surface shown outside of the first aperture 56. The nose 50 is the working end of the device. The face 51 of the device is perpendicular to the nose 50, that is, into the plane of this figure. This face 51 surface must be machined to a high tolerance with a smooth surface finish therefore to be used to establish a known indicator setting. The face 51 also should be manufactured within one ten thousandths of an inch (0.0001) and should have a surface finish of 32 RMS, root mean square of profile height deviation from the mean line, or better.

FIG. 2 shows a front view of the alternative embodiment of the invention. This device has less height than the device in FIG. 1 and suits larger diameter gages. The second aperture 58 is a pocket that accepts an adapter on a tool holder. The nose 50 of the gage is perpendicular to the face 51. The face 51 also has as its diameter first diameter D, or main diameter. The face has its height h less than the length L of the invention, more particularly, h as the thickness of the head is less than 51%, or fifty one per centum, of the length L of the device. In one embodiment, the face diameter is half or less of the length. The face 51 and the shank 54 are concentric to each other. The shoulder 52 is perpendicular to the face 51 and is tangent to the neck 53. The neck 53 is a small radius which serves as a transition between the shoulder 52 and the shank 54. The end 55 is parallel to the nose 50. The first aperture 56 is located in the center of the nose 50. The first aperture 56 is a clearance hole for a fastener used to mount the device to an arbor type tool holder. The second aperture 58 is a precise size that locates the device. The second aperture 58 must be machined concentric to the face 51 to eliminate inaccuracies. A throat 57 communicates through the first aperture 56, through the shank 54, and into the second aperture 58. The throat 57 moreover provides clearance for a fastener placed therein, not shown, during usage. The first aperture 56, the throat 57, and the second aperture 58 have a concentric positioning as shown. Also, the second aperture opens into the throat, the throat then extends within the shaft of the head, and the throat opens into the first aperture. Outwardly from the second aperture, this embodiment of the invention has a slot 59 machine into the end 55. The slot 59 has a width markedly less than the diameter of the shank as shown in FIG. 2*a* and a depth markedly less than the length of the device. The slot guides an element of the spindle, not shown, during usage. The slot is opposite the nose.

FIG. 2A shows a top view of the alternate embodiment shown in FIG. 2. The end 55 is at the end of the shank 54. The shank 54 is perpendicular to the end 55 and follows down to the neck 53. The neck 53 connects to the shank 54 then to the shoulder 52. The face 51 of the device connects to the shoulder 52. When manufacturing the devices the face 51 needs to be machined perpendicular to the nose 50.

FIG. 2B shows a bottom view of the alternate embodiment shown in FIG. 2. The throat 57 is in the center of the device. The first aperture 56 travels around the throat 57. The nose 50, appears as the surface shown outside of the first aperture 56. The face 51 of the device is perpendicular to the nose 50. The nose 50 is the working end of the device. The face 51 is manufactured with a high tolerance and is used to transfer a measurement. The distance from the center of the device to the face 51 is a known radial value. The face 51 should be manufactured within one ten thousandths of an inch (0.0001) and should have a surface finish of 32 RMS, root mean square of profile height deviation from the mean line, or better.

Figure 2C:
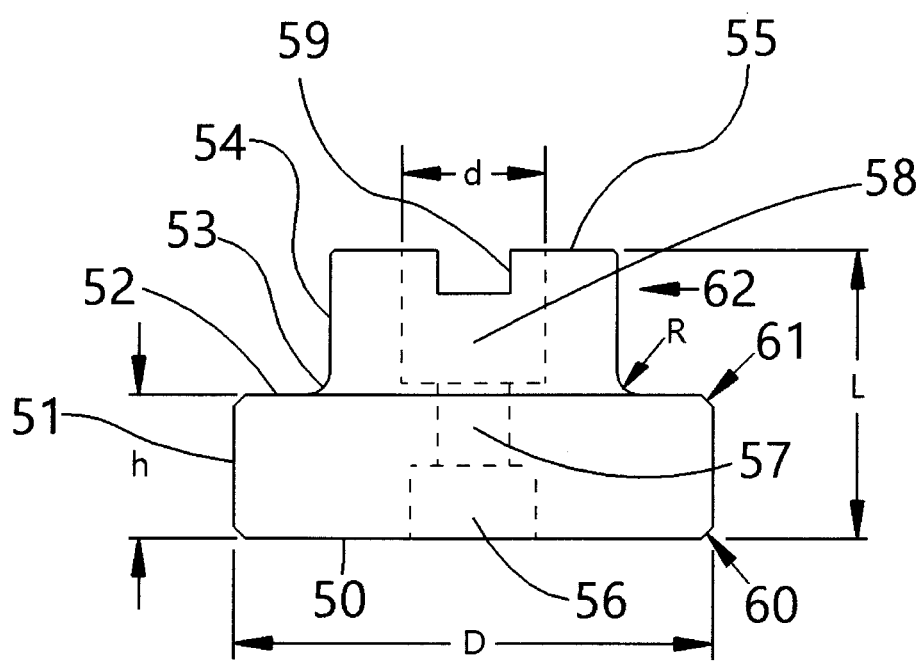
FIG. 2C is a side view of the alternate embodiment.

Turning to FIG. 2C, this alternate embodiment has the slot 59 upon the end 55. The slot 59 extends slightly into the shank 54 and generally less than the depth of the second aperture 58 and well before the throat. The slot spans the shank along a diameter and opens at the edge of the shank in two diametrically opposite positions. The slot has a U shape cross section and as an alternate embodiment, the slot has a rectangular cross section. Because the invention has symmetry, one side view, FIG. 2C is provided.

Figure 3:
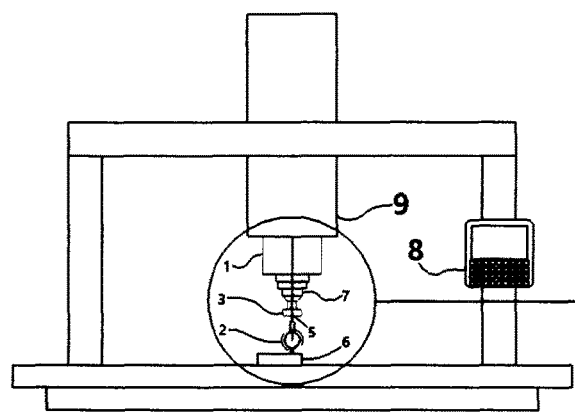
FIG. 3 is a front view of a machine spindle with the invention installed.
Figure 3A:
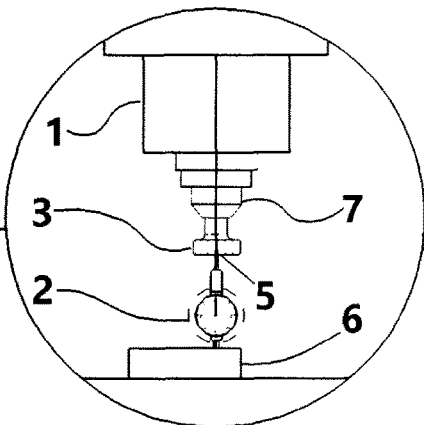
FIG. 3a is a detail view.
Figure 4:
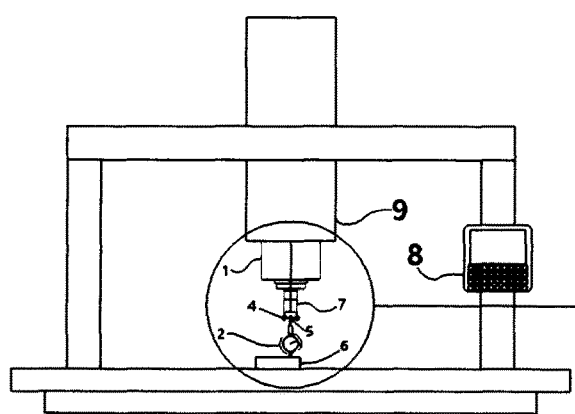
FIG. 4 is a front view of a machine spindle with a cutting tool installed.
Figure 4A:
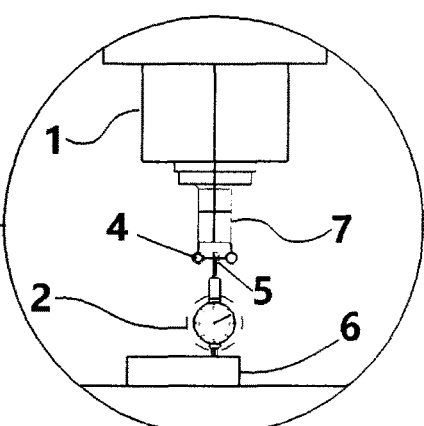
FIG. 4a is a detail view.

FIG. 3 and FIG. 4 are front views that show a method used to obtain the precise size of a cutting tool used in a machining center. The CNC machine 9 has linear axes that allow the spindle 1 to be traversed. FIG. 3 is a front view of a machine spindle 1 with the invention 3 installed showing the invention (gage) setting with an indicator 2, and FIG. 3*a* is a detail view. FIG. 4 is a front view of a machine spindle 1 with a cutting tool 4 installed showing the tool measurement off of the known indicator setting, and FIG. 4*a* is a detail view.

FIG. 3 shows a present invention 3 installed in a tool holder 7 located in a machine spindle 1. A CNC machine 9 with linear axes is shown with a spindle 1. An indicator 2 is shown set to a known position on the present invention 3. A contact point 5 of the indicator to the gage 3 has a setting at the highest peak of the gage 2 diameter (D) as also shown in FIG. 3*a*. The CNC machine 9 has a controller 8 for operating a program and manually joggling the spindle 1. The indicator block 6 is shown with an indicator 2. An indicator block 6 allows the indicator 2 to be securely mounted beneath the spindle 1.

FIG. 4 shows a cutting tool 4 installed in a tool holder 7 located in a machine spindle 1. An indicator 2 measures the deviation from the original setting in FIG. 3. The contact point 5 of the indicator to a cutting tool 4 is measured at the highest peak of the cutting edge as also shown in FIG. 4*a*. This measurement shown on the indicator 2 determines the precise size of the cutting tool 4.

Figure 5:
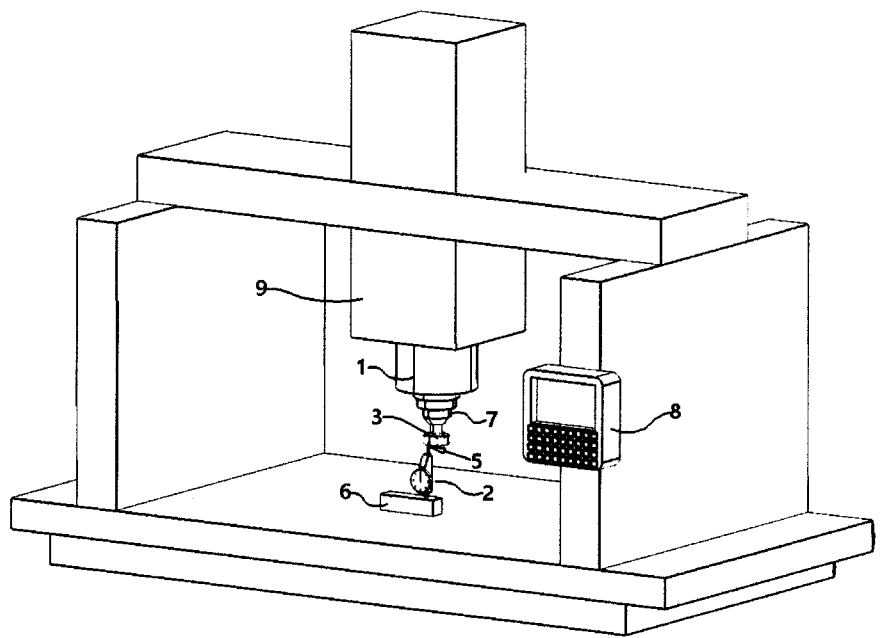
FIG. 5 is an isometric view showing a machine spindle with the invention installed.

FIG. 5 is an isometric view showing a machine spindle 1 with the invention 3 installed. And following, FIG. 6 is an isometric view showing a machine spindle 1 with a cutting tool 4 installed.

FIG. 5 is an isometric view of FIG. 3. A CNC machine 9 with linear axes is shown with a spindle 1. A CNC machine 9 has a controller 8 for operating a program as well as joggling the spindle 1. This view shows the relation between the indicator setting and the present invention 3. FIG. 5 shows how a machine spindle 1 having a gage 3 should be positioned closely to an indicator 2 to make the preferred setting.

Figure 6:
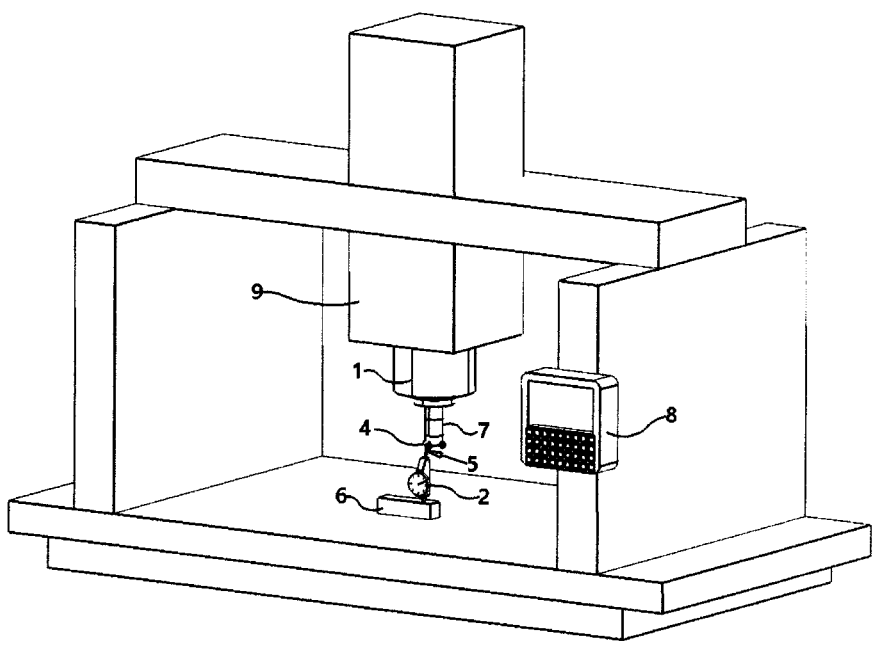
FIG. 6 is an isometric view showing a machine spindle with a cutting tool installed.

FIG. 6 is an isometric view of FIG. 4. This view shows the relation between the indicator 2 setting and the cutting tool 4 being measured. FIG. 6 is the same as FIG. 5 but with a difference of a cutting tool 4 installed in the spindle 1. FIG. 6 shows the deviation of the indicator setting made in FIG. 5 from that of the highest peak of the cutting edge on the cutting tool 4. The value on the indicator 2 is the measurement from which the nominal diameter size is calculated. A positive indicator value determines the cutting tool 4 is oversize from the nominal size. A negative indicator value determines the cutting tool 4 is undersize from the nominal size.

Figure 7:
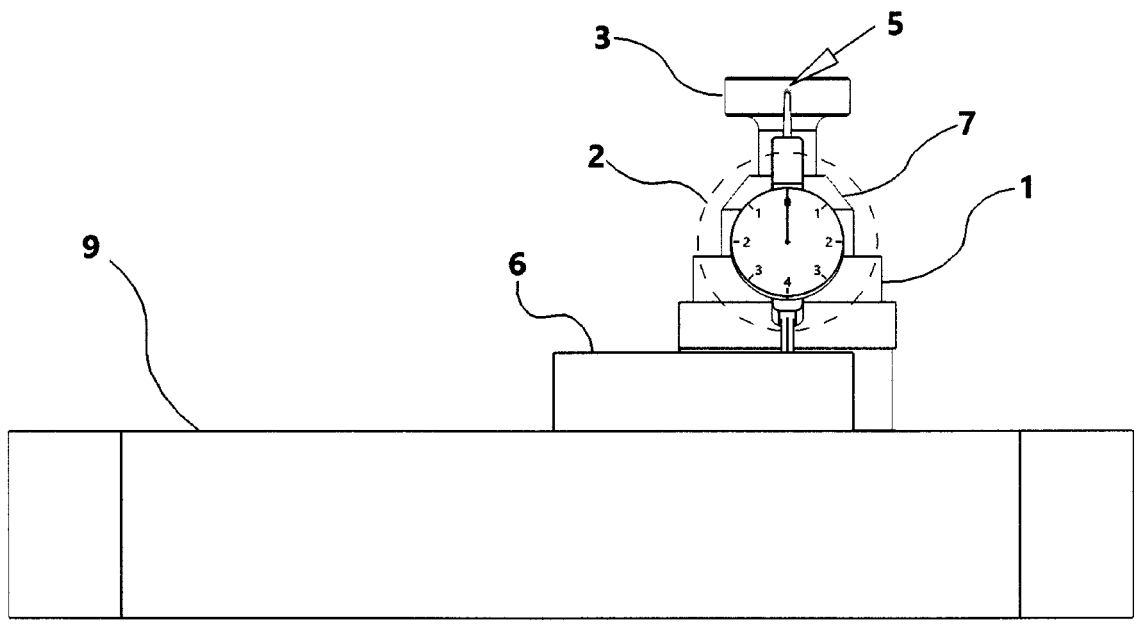
FIG. 7 is a front view of a fixture outside of a machining center with the invention installed.
Figure 8:
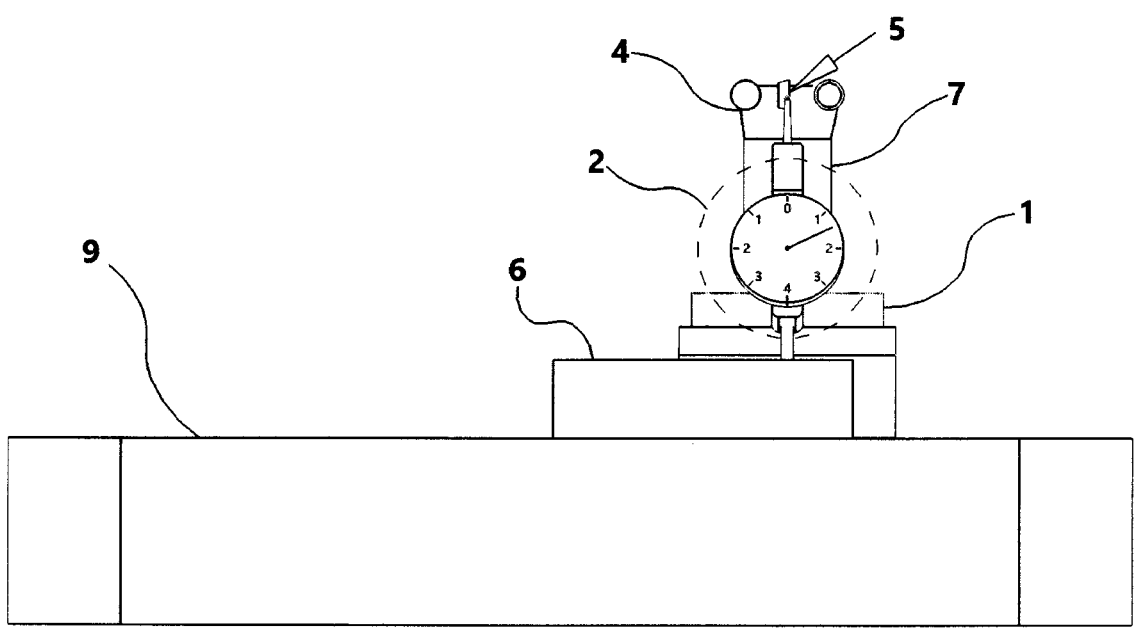
FIG. 8 is another front view of a fixture outside of a machining center with a cutting tool installed.
Figure 9:
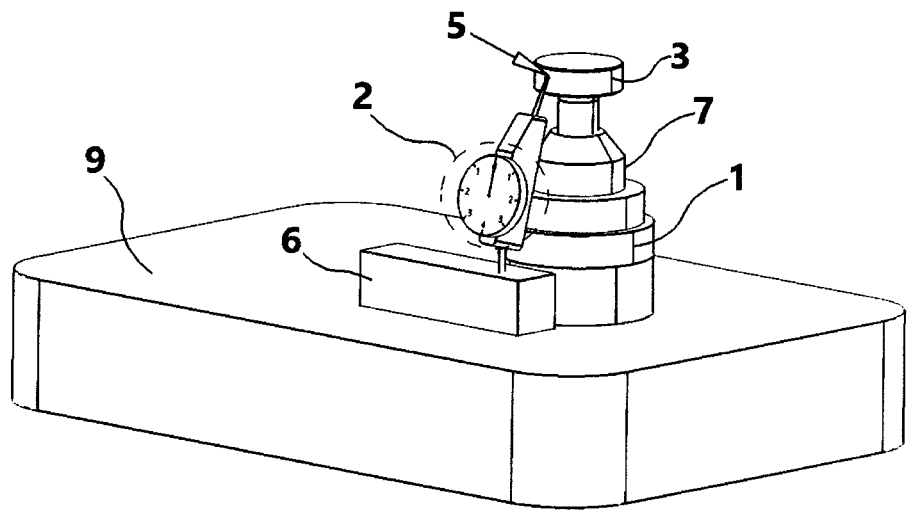
FIG. 9 is an isometric view showing a fixture with the invention installed.
Figure 10:
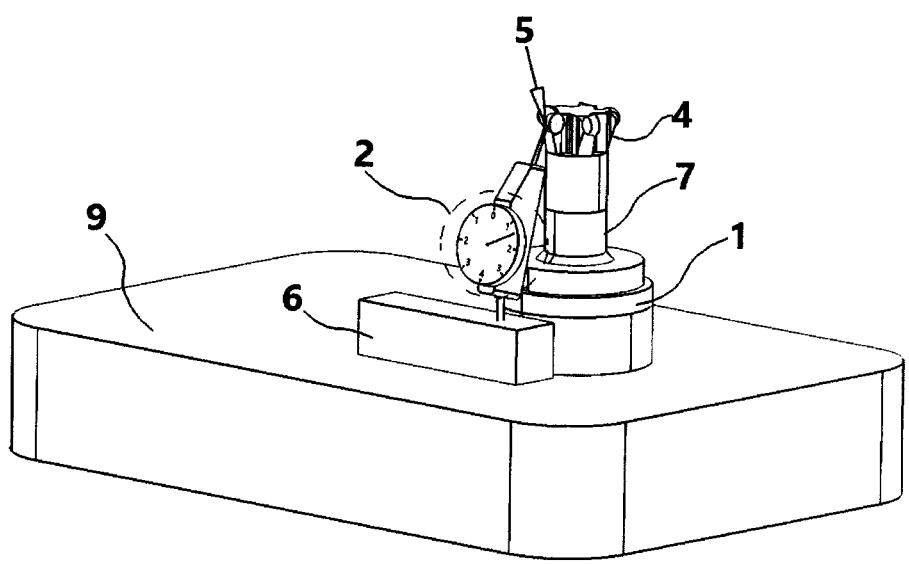
FIG. 10 is an isometric view showing a fixture with a cutting tool installed; and, FIG. 11 is a table of results utilizing the present invention.

The process shown in FIGS. 7-10 is referred as an offline process because the time used to determine the actual cutting tool size is done outside a machining center. FIG. 7 is a front view of a fixture 9 outside of a machining center with the invention 3 installed showing the invention, or gage, setting with an indicator 2. FIG. 8 is another front view of a fixture 9 outside of a machining center with a cutting tool 4 installed showing the tool measurement from a known indicator setting. FIG. 9 is an isometric view showing a fixture 9 with the invention 3 installed. FIG. 10 is an isometric view showing a fixture 9 with a cutting tool 4 installed.

FIG. 7 and FIG. 8 are front views of the method used to obtain the precise size of a cutting tool 4 used in a fixture 9 outside of a machining center. FIG. 7 shows a present invention 3 located in a fixture 9 with a spindle 1. An indicator 2 is shown being set to a known position on the invention 3. A fixture 9 retains a spindle 1 that accepts a tool holder 7. The indicator 2 with an indicator block 6 is mounted near the spindle 1. The contact point 5 of the indicator to the gage 3 is set at the highest peak of the gage 3 zo diameter. In FIG. 7 the indicator 2 is positioned and set at one stationary point to be used again in FIG. 8.

FIG. 8 shows a cutting tool 4 placed in a fixture 9 with a spindle 1. An indicator 2 measures the deviation from the original setting in FIG. 7. The contact point 5 of the indicator to the cutting tool 4 is measured at the highest peak of the cutting edge. This measurement shown on the indicator 2 determines the precise size of the cutting tool 4.

This precise height from the spindle to the cutting edge contact point may need to be predetermined prior to setting the invention 3 in FIG. 7. The indicator block 6 with indicator 2 is positioned near the spindle for measuring. The cutting tool 4 assembled in a tool holder 7 is shown taking a measurement off of the indicator 2.

FIG. 9 is an isometric view of FIG. 7. This view shows the relation between the indicator 2 setting and the invention 3. FIG. 9 shows how a spindle 1 in a fixture 9 with the gage 3 should be positioned closely to an indicator to make the preferred setting. Some cutting tools have small surface areas of contact. Without having a CNC machine with a controller to adjust the contact height of the cutting tool contact point 5, as also later shown in FIG. 10, the cutting tool height may need to be predetermined so the indicator 2 is not moved. The indicator block 6 and indicator 2 must be kept in one stationary position for precise results.

FIG. 10 is an isometric view of FIG. 8. This view shows the relation between the indicator 2 setting and the cutting tool 4 being measured. FIG. 10 shows the deviation of the indicator setting made in FIG. 9 from that of the highest peak of the cutting edge on the cutting tool 4. The value on the indicator 2 is the measurement from which the nominal diameter size is calculated from. A positive indicator value determines the cutting tool 4 is oversize from the nominal size. A negative indicator value determines the cutting tool 4 is undersize from the nominal size.

The standard tool diameter gage has a method for its use included with the invention. The process of measuring a cutting tool to obtain its exact precise size is a two step process which is illustrated in FIGS. 3, 4, 7, 8. The two step process has been magnified into the following steps to highlight the critical details of the process. The method includes the following steps:

First, install the gage in a spindle. Once the preferred cutting tool 4 is selected for use it will determine the size of the standard tool diameter gage 3 to use. As shown in FIG. 3, a standard tool diameter gage 3 is installed in a tool holder 7 and is then mounted in a spindle 1.

Second, set an indicator with the gage. The spindle 1 assembly is traversed to a test indicator 2 which preferable has a dial graduation of 0.0001. As shown in FIG. 3, the indicator stylus should be loaded to a common value shown on the dial. Setting this point with the indicator should be done on the highest peak of the standard tool diameter gage 3.

Third, verify the contact point 5 has been achieved. Traverse the standard tool diameter gage back and forth across the indicator to ensure this highest point of contact has been reached. Furthermore manually rotate the spindle to ensure there is no run out as to this would offset the measurement. This new indicator set point will be used to test the cutting tool.

Fourth, retract and remove the standard tool diameter gage 3 from the spindle 1. The indicator 2 and the indicator block 6 must be kept in a stationary position. It is important that the indicator 2 is not adjusted or bumped after this initial setting. The point of contact on the indicator 2 from the center of the spindle is now a known radial value.

Fifth, install the cutting tool 4 in a spindle 1. As shown in FIG. 4, the selected cutting tool 4 installed in a tool holder 7 is mounted in a spindle 1. The cutting tool should be cleaned and clear of any debris from previous manufacturing use.

Sixth, reference the cutting tool to the set indicator. It is important that the indicator 2 is not adjusted or bumped from the initial setting from the second step.

Seventh, verify the indicator reading. By slowly rotating the spindle, find the highest peak 5 of the cutting edge on the cutting tool 4. Commonly rotate the cutting tool in the reverse rotation of its cutting use. This allows the indicator 2 to be loaded with little resistance by testing the relieved portion of the cutting edge first. This keeps the zo indicator 4 in a stationary position.

Eighth, record the measurement. The measurement reading taken and shown in FIG. 4 can be a positive or negative value based off the initial setting in step 1. A positive reading will indicate the tool is oversize of that of the nominal tool size. A negative reading will indicate the tool is undersize of that of the nominal tool size.

And, Ninth, calculate the discovery. The indicator reading on the test indicator is a radial value. The value (whether positive or negative) must be multiplied by 2 in order to add or subtract to the nominal diameter to determine the cutting tool's precise size.

FIGS. 7, 8 show the same method as described in FIGS. 3, 4 but use a fixture 6 outside of a machine tool.

In FIG. 1 and FIG. 2 the nose 50, the face 51, and the shoulder 52 are described as the head of the mechanical device. The face 51 is a surface that spans continuously around the perimeter of the nose 51. The face 51 has 2 bevels as at 60 and 61 that run continuously and circumferentially around the nose 51 and shoulder 52 respectively which are adjacent to the face. The profile of the standard tool diameter gage is similar to a cutting tool however the face 51 is a continuous surface with no cutting edges or relief areas. The bevels 60 and 61 provide breaks to remove sharp corners for handling and provide lead-in surfaces for setting an indicator to the face 51.

FIG. 1 represents a standard tool diameter gage manufactured from one piece of steel. For larger standard tool diameter gages two piece designs welded together are more cost efficient to manufacture. FIG. 2 and FIG. 2A show a horizontal slot 59 to accept drive keys in a tool holder. The horizontal slot 59 orients the standard tool diameter gage to a tool holder and provides clearance to accept drive keys.

FIG. 11 displays a table showing results of measurements found using the standard tool diameter gage against a selection of different size cutting tools ranging from ½ inch to 6 inch in diameter. The table contains four columns from the left: Nominal Tool Size, Decimal Equivalent, Indicator Reading, and Actual Tool Size.

For the most accurate and consistent results Actual Tool Size is measured and identified at room temperature, sixty-eight degrees Fahrenheit.

The Nominal Tool Size column displays the cutting tool diameter chosen for measurement. This size is the value used when programming a toolpath strategy. Nominal Tool Size, either imperial or metric, shows inches and millimeters respectively. For CNC programming the Nominal Tool Size represents the selected cutting tool diameter based upon the machining of work piece features. Often overlooked, this value should be precise and reviewed by a machinist to measure the value of its Decimal Equivalent.

The Decimal Equivalent column displays the value of the Nominal Tool Size in a four place decimal callout, that is, four digits after the decimal point. Programming machine tools requires this four place decimal callout. Precise work pieces require precise programming. The Decimal Equivalent serves as the programming value for machine tools. In the Decimal Equivalent column all metric tool sizes have been converted to imperial units in a four place decimal callout.

The Indicator Reading column is the measurement taken from using the standard tool diameter gage against its Nominal Tool Size. Using the standard tool diameter gage this measurement value is found and illustrated in FIGS. 4a, 6, 8, 10. This measurement can be a positive (+) or a negative (−) value. A positive measurement value identifies that the tool size is larger than its Nominal Tool Size. A negative measurement value identifies the tool size that is smaller than its Nominal Tool Size. Positive values, or larger tool diameters, will remove more material from the work piece than programmed. Negative values, or smaller tool diameters will leave excess material on the work piece than programmed. The Indicator Reading has a radial value and subject to multiplication by 2 when calculating the Actual Tool Size.

The Actual Tool Size column shows the precise result identified from using the standard tool diameter gage. The Indicator Reading value is multiplied by 2 and added to or subtracted to the Decimal Equivalent to identify the Actual Tool Size. This value serves as the actual size for use when programming tool path strategies. Actual Tool Size goes to four digits after the decimal point, that is, a four place decimal callout.

In this selection of twenty different tool sizes shown in FIG. 11, the Actual Tool zo Size differs from its Nominal Tool Size in each instance. Actual Tool Size differs from the Nominal Tool Size ranging from as much as 0.0002 inch in diameter to 0.0380 inch in diameter. These Actual Tool Sizes are measurements for each of these specific cutting tools, based on its physical characteristics. Additional cutting tools with the same Nominal Tool Sizes as in FIG. 11 will display different results based on their physical characteristics. As a safeguard, tools with larger actual sizes than nominal should be discarded or replaced to prevent scrap work pieces.

Upon conducting the measurement series tabulated in FIG. 11, based on these Actual Tool Sizes the Applicant found the average amount of deviation from Nominal Size is 0.0057 inch in diameter. This amount of deviation from nominal is unexpected by the Applicant and well outside the acceptable tolerance of within 0.0002 in diameter. The Applicant applied this information to the present invention and has the gage diameter denote the actual tool size of the present invention. The invention then has its gage diameter within 0.0057 inch of a nominal tool size attributed to the invention as shown, or as measured, as a reading upon a test indicator abutting the face of the invention. The present invention assists a machinist to know that the tool selected has the diameter intended.

While a preferred embodiment of the standard tool diameter gage has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, polymer, metal, composite, may be used. Although providing a standard tool diameter gage has been described, it should be appreciated that the standard tool diameter gage herein described is also suitable for the optical, astronomical, and other industries that utilize precision positioned pieces.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device used in a CNC machine tool having a spindle and with a test indicator, said device comprising:
   a round cylindrical head with a face, said face having a diameter, said face diameter having a nominal size, and a flat nose perpendicular to said face;
   a round cylindrical shank extending perpendicular to said head opposite said nose, said shank being centered upon said head, said shank having a lesser diameter than that of said face, said face being parallel to said shank and extending circumferentially about said nose;
   a first aperture centered upon said nose, said first aperture being concentric with said shank;
   a second aperture centered upon said shank opposite said nose, said second aperture being concentric with said shank and said first aperture;
   wherein said shank is adapted to insert into the spindle referenced to a setting from the test indicator;
   said shank is adapted to attach to a tool holder, and said shank is adapted to extend from the spindle;
   said device having a gage diameter being the same as the diameter of said face;
   said shank being concentric within 0.0001 of an inch to said face and to the gage diameter of said device;
   wherein said face has a precision machined surface at most 32 RMS and said shank has a precision machined surface at most 32 RMS, and wherein said face diameter is from about 0.09375 inches to about 24.000 inches;
   a neck flaring outwardly from said shank opposite said second aperture;
   said neck merging into a shoulder opposite said shank, said shoulder having a greater diameter than said shank; and,
   said shoulder merging into said head opposite said nose.

2. The device of claim 1 further comprising:
   said device having a length; and,
   said face having a height wherein said height of said face is less than said length of said device.

3. The device of claim 2 wherein said height of said face is less than one quarter of the length of said device.

4. The device of claim 2 further comprising:
   said second aperture extending through said shank, said second aperture opening into a throat within said head, said throat opening into said first aperture; and,
   said second aperture, said throat, and said first aperture being concentric.

5. The device of claim 4 further comprising:
   a slot across said shank and opposite said nose, said slot communicating with said second aperture; and,
   said height of said face being less than fifty one per centum of the length of said device.

6. A device used in a fixture with a spindle, the fixture including a test indicator, said device comprising:
   a round cylindrical shank having a diameter and an end, and a precision machined surface at least 32 RMS;
   a round cylindrical head upon said shank opposite said end, said head having a face and said face having a diameter, said face diameter having a nominal size, and a flat nose perpendicular to said face, said face being parallel to said shank and extending circumferentially about said nose, said head being centered upon said shank and extending perpendicular to said shank head, said shank being centered upon said head and opposite said nose, and said head having a greater diameter than that of said shank;
   a first aperture centered upon said nose, said first aperture being concentric with said shank and having a precision machined surface at least 32 RMS;
   a second aperture centered upon said shank opposite said nose, said second aperture being concentric with said shank and said first aperture, and having a precision machined surface at least 32 RMS;
   said face being parallel to said shank and having a precision machined surface at least 32 RMS and a diameter from about 0.09375 inches to about 24.000 inches;
   wherein said end is adapted to insert into the spindle and wherein said device is adapted to establish a known indicator setting;
   a neck flaring outwardly from said shank opposite said second aperture;
   said neck merging into a shoulder opposite said shank, said shoulder having a greater diameter than said shank; and,
   said shoulder merging into said head opposite said nose.

7. The device used in a fixture with a spindle of claim 6 further comprising:
   said device having a length; and,
   said face having a height wherein said height of said face is less than said length of said device.

8. The device used in a fixture with a spindle of claim 7 further comprising:
   said second aperture extending through said shank, said second aperture opening into a throat within said head, said throat opening into said first aperture; and,
   said second aperture, said throat, and said first aperture being concentric.

9. The device used in a fixture with a spindle of claim 8 wherein said height of said face is less than one half of the length of said device.

10. The device used in a fixture with a spindle of claim 8 further comprising:
    a slot across said shank and opposite said nose, said slot communicating with said second aperture.

11. The device used in a fixture with a spindle of claim 8 further comprising:
    a bevel between said nose and said face;
    a bevel between said face and said shoulder;
    said first aperture having a bevel proximate said nose; and,
    said second aperture having a bevel proximate said end.

12. The device used in a fixture with a spindle of claim 6 further comprising:
    said device having a gage diameter being the same as the diameter of said face;
    said shank being concentric within 0.0001 of an inch to said face and to the gage diameter of said device;
    said gage diameter denoting an actual tool size of said device; and,
    said gage diameter being within 0.0057 inch of a nominal tool size attributed to said device as shown as a reading upon the test indicator.

13. A device used in a CNC machine tool having a spindle, said device comprising:
    a round cylindrical shank having a diameter and an end, and a precision machined surface at least 32 RMS;
    a round cylindrical head upon said shank opposite said end, said head having a face and said face having a diameter, said face diameter having a nominal size, and a flat nose perpendicular to said face, said head being centered upon said shank and extending perpendicular to said shank head, said shank being opposite said nose, said head having a greater diameter than that of said shank, and, said face being parallel to said shank and extending circumferentially about said nose;
    a first aperture centered upon said nose, said first aperture being concentric with said shank and having a precision machined surface at least 32 RMS;
    a second aperture centered upon said shank opposite said nose, said second aperture being concentric with said shank and said first aperture, and having a precision machined surface at least 32 RMS;
    said face being parallel to said shank and having a precision machined surface at least 32 RMS and a diameter from about 0.09375 inches to about 24.000 inches;
    a neck flaring outwardly from said shank opposite said second aperture, said neck merging into a shoulder opposite said shank, said shoulder having a greater diameter than said shank, said shoulder merging into said head opposite said nose;
    a bevel between said nose and said face;
    a bevel between said face and said shoulder;
    said first aperture having a bevel proximate said nose;
    said second aperture having a bevel proximate said end;
    said device having a length;
    said face having a height wherein said height of said face is less than one half of the length of said device; and,
    the diameter of said face being within 0.0057 inch of a nominal tool size attributed to said device as shown as a reading upon the test indicator; and,
    wherein said end is adapted to insert into the spindle and thus said device establishes a known indicator setting.

14. The device used in a fixture with a spindle of claim 13 further comprising:
    said second aperture extending through said shank, said second aperture opening into a throat within said head, said throat opening into said first aperture; and,
    said second aperture, said throat, and said first aperture being concentric.

* * * * *